United States Patent [19]

McCormick et al.

[11] Patent Number: 4,545,802

[45] Date of Patent: Oct. 8, 1985

[54] SOIL TREATING METHOD AND COMPOSITION FOR CONSERVING NITROGEN IN SOIL

[75] Inventors: Ronald W. McCormick; Richard B. Rogers, both of Concord, Calif.

[73] Assignee: The Dow Chemical Company, Midland, Mich.

[21] Appl. No.: 624,426

[22] Filed: Jun. 25, 1984

[51] Int. Cl.[4] ............................................. C05G 3/08
[52] U.S. Cl. ................................................. 71/27; 71/28; 71/902; 71/DIG. 1
[58] Field of Search ............... 260/429 R, 429.9; 71/11, 27, 28, 902, DIG. 1

[56] References Cited

U.S. PATENT DOCUMENTS 3,635,690  1/1972  Griffith ............................... 71/27 X Primary Examiner—Ferris H. Lander
Attorney, Agent, or Firm—S. Preston Jones; Ronald G. Brookens

[57] ABSTRACT

Certain pyrazoline compounds are employed as the active nitrification inhibitor in the presence of reduced nitrogen fertilizers.

9 Claims, No Drawings

SOIL TREATING METHOD AND COMPOSITION FOR CONSERVING NITROGEN IN SOIL

BACKGROUND OF THE INVENTION

The majority of plants obtain most or all of their nitrogen requirements from the soil. The adequate provision of nutrient nitrogen in soil for plant growth is one of the foremost agronomic problems. The nitrogen in the soil is found to occur primarily in three forms: organic nitrogen, ammonium nitrogen and nitrate nitrogen, of which ammonium nitrogen and nitrate nitrogen are the primary forms utilized by plants. This nitrogen is absorbed by plants in solution from the soil in the form of ammonium ions and nitrate ions.

The ammoniun nitrogen in the soil occurs principally as colloidal-bound nitrogen, only very small quantities of the ammonium form of soil nitrogen are lost from the feeding zone of the plants by leaching.

The nitrate nitrogen in the soil is derived from the oxidation or nitrification of ammonium nitrogen by soil bacteria or by the addition of inorganic nitrate fertilizers such as ammonium nitrate, sodium nitrate, potassium nitrate and calcium nitrate. The inorganic nitrate compounds are readily soluble in water and the aqueous soil medium. When so dissolved, the nitrate nitrogen largely exists as the nitrate ion.

The nitrogen contained in the nitrate, in contrast to ammonium nitrogen, is not adsorbed by the sorption carriers of the soil. A further discussion of the nature of this nitrogen problem in agriculture is set forth in U.S. Pat. No. 3,135,594.

Because of the anionic nature of this nitrate ion, nitrate nitrogen is rapidly leached by rainfall and irrigation and readily lost from the feeding zone of the plants. Further, the nitrate nitrogen is reduced by many soil bacteria to nitrogen gas. The latter process is known as denitrification and accounts for an additional loss of large quantities of nitrate nitrogen from the soil. The yearly loss from leaching and denitrification amounts to from 20 to 80 percent of the nitrate nitrogen found in the soil.

To overcome the loss of ammonium nitrogen in the soil by nitrification, it is the practice to add to the soil a nitrification inhibitor.

Representative nitrification inhibitors and their use can be found in U.S. Pat. Nos. 3,135,594, 3,494,757 and 3,635,690 and British Pat. No. 1,592,516.

While the known inhibitors are effective in reducing nitrification, they, for the most part, have a major drawback in that they must be incorporated into the soil within a very short period of time, i.e., a few minutes to a few hours in order to avoid losses of the inhibitor to the air. This requirement for quick incorporation hinders and/or restricts the use of nitrification inhibitors in agronomic practices where no till or minimum till is employed and in those areas where fertilizers are added and incorporation is delayed.

SUMMARY OF THE INVENTION

The present invention is directed to methods and compositions useful in crop culture, and is particularly concerned with new agronomical practices and compositions for conserving nitrogen in soil by suppressing the nitrification of ammonium nitrogen therein. The active agent of the compositions employed in such methods is 5-methyl-2-pyrazoline or a pyrazoline compound corresponding to the formula

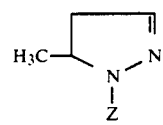

wherein Z represents alkylcarbonyl (—C(O)R), alkylcarboxyl (—COOR), alkylthiocarboxyl (—COSR), N,N-dialkylcarbamoyl (—CON(R)₂), N,N-dialkylthiocarbamoyl (—CSN(R)₂) or alkylsulfonyl (—SO₂R) and each R independently represents a straight or branched chain alkyl group of 1 to 4 carbon atoms, inclusive or a cyclic alkyl group of 3 to 4 carbon atoms, inclusive.

While the active pyrazolines of the present invention are normally depicted as shown in Formula I, it is believed that these compounds also exist in three additional isomeric forms. These isomers can be depicted as follows:

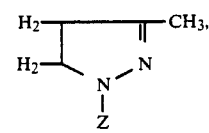

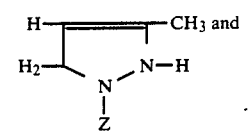

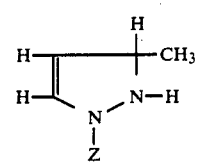

wherein Z is as hereinabove set forth.

It is further believed that the product obtained in the preparation of Formula I is a mixture of the four isomers and the depiction of either one of the isomers should be taken as the inclusion of all four isomers.

It is also believed that 5-methyl-2-pyrazoline exist in five isomeric forms and the product obtained in its preparation is a mixture of the five isomers and the depiction of either one of the isomers should be taken as the inclusion of all five isomers. These isomers can be depicted as follows:

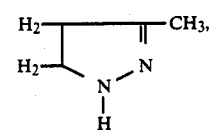

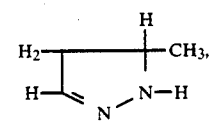

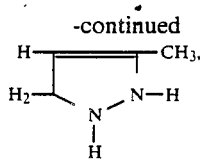

C

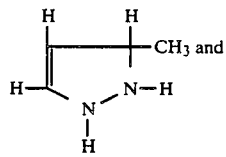

D

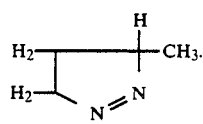

E

The method of the present invention comprises applying to soil a composition which contains, as the active nitrification inhibitor, a pyrazoline compound as defined above. A further feature of the method of the present invention is that the pyrazoline compound in admixture with a reduced nitrogen fertilizer can be applied to the surface of soil where it can remain without incorporation into the soil for a period of up to 3 days or more, with at least about 70 percent of the pyrazoline compound remaining. After administration subsequent irrigation or rainfall can distribute the pyrazoline compound throughout the soil.

The expression "soil" is employed herein in its broadest sense to be inclusive of all conventional "soils", as defined in Webster's New International Dictionary, Second Edition, unabridged, published in 1937, G. C. Merriam Co., Springfield, Mass. Thus, the term refers to any substance or medium in which plants may take root and grow, and is intended to include not only earth, but also compost, manure, muck, sand, synthetic growth mediums such as vermiculite and pearlite and the like, adapted to support plant growth.

By the practice of this invention, the nitrification of ammonium nitrogen in the soil to nitrate nitrogen is suppressed, thereby preventing the rapid loss of ammonium nitrogen from the soil. Furthermore, by proper distribution of the pyrazole compound this action of inhibiting the transformation of ammonium nitrogen to nitrate nitrogen is effective over a prolonged period of time. The ammonium nitrogen may arise from added ammonium nitrogen fertilizers or be formed in the soil by conversion of the organic nitrogen constituents found in soil or added thereto as components of organic fertilizers.

The expression "reduced nitrogen fertilizers" as employed in the present specification and claims, is understood in the art, as embracing both inorganic and organic nitrogenous materials containing nitrogen in the reduced state. Examples of known reduced nitrogen fertilizers include anhydrous ammonia, aqueous ammonia, inorganic ammonium salts such as ammonium phosphates, ammonium nitrate and ammonium sulfate, ammonium salts of organic acids, urea, cyanamide, guanidine nitrate, dicyandiamide, thiourea, amines, urea-form and other nitrogen-containing organic chemical fertilizers as well as protein mixtures, animal tankages, green manure, fish products, crop residues, and other materials known to be sources of ammonium ions in soil.

The application of an effective, nitrification inhibiting, dosage of the pyrazoline compound to the soil is essential for the practice of the present invention. In general, good results are obtained when the pyrazoline compound is applied in the amount of from about 0.05 to about 10.0 pounds per acre of soil. The preferred amounts to be employed are dependent upon the particular situation. Thus, in determining the amount to be employed, consideration is necessary as to the soil pH, soil organic matter, temperature, soil type and time of application. By dispersing very large dosages to soil, a prolonged inhibition of nitrification can be obtained over a period of many months. The concentration of the active pyrazoline compound is eventually reduced to a minimum by decomposition in the soil.

In one method for carrying out the present invention, the pyrazoline compound is distributed to the soil in a broadcast application such as by spraying, dusting, distributing in irrigation water, etc. In such application, the pyrazoline compound is supplied in amounts of from about 0.05 to about 10.0 pounds per acre.

In another method for carrying out the present invention, the pyrazoline compound is administered to the soil in a band or row application. In such application, administration is made with or without carrier in amounts sufficient to supply to the soil a concentration of the pyrazoline compound which can be as high as 10.0 pounds per acre or more.

In one embodiment of the present invention, the pyrazoline compound is distributed throughout the soil prior to seeding or transplanting the desired crop plant.

In another embodiment, the soil in the root zone of growing plants is treated with the pyrazoline compound in an amount effective to inhibit nitrification but sublethal to plant growth.

In a further embodiment, the pyrazoline compound can be applied following harvest or after fallowing to prevent rapid loss of ammonium nitrogen and to build up the ammonium nitrogen formed by conversion of organic nitrogen compounds. Such practice conserves the soil nitrogen for the following growing season. In such application the upper limit is primarily an economic consideration.

Additionally, the pyrazoline compound can be applied prior to, subsequent to or simultaneous with the application of a reduced nitrogen fertilizer. Such practice prevents the rapid loss of the ammonium nitrogen added as fertilizer and the ammonium nitrogen formed from the organic reduced nitrogen in fertilizers by the action of soil bacteria. In a preferred procedure, the pyrazoline compound is employed as a solid or liquid composition comprising a reduced nitrogen fertilizer in intimate admixture with the pyrazoline compound.

As indicated above, the present method embraces distributing the pyrazoline compound as a constituent in liquid or solid fertilizer compositions. In such practice, the pyrazoline compound is admixed with the fertilizer and such mixture can be modified with one or more additaments or soil treating adjuvants to formulate the mixtures employing conventional procedures as wettable powders, emulsifiable concentrates, dust, granular formulations or oil or water flowable emulsion concentrates. In preparing such formulations, the pyrazoline compound/fertilizer mixture is extended with adjuvants including water, petroleum distillates or other liquid carriers, surface-active dispersing agents and inert finely-divided solids. Preferred adjuvants are surface-active dispersing agents and inert finely-divided solids; these adjuvants cooperate with the pyrazoline compound so as to facilitate the practice of the present invention and to obtain an improved result. These compositions may also contain as additional adjuvants one or more other biologically active materials such as herbicides, insecticides, fungicides, miticides, bactericides, nematocides, and the like. The only requirement for these added materials is that they be both chemically and biologically compatible with the pyrazoline compound.

The concentration of the pyrazoline compound in the compositions can vary considerably provided the required nitrification inhibition dosage of the effective agent is supplied to the soil. In general, good results are obtained when employing liquid compositions containing from about 0.05 to about 5.0 percent by weight of the pyrazoline compound; in some operations, however, compositions containing amounts of pyrazoline compound in excess of 5.0 percent, such as from 5 to 98 percent of the active pyrazoline compound by weight of composition are conveniently employed, as for example, in row or band application. With solids, good results are usually obtained with compositions containing from 0.05 to 5.0 percent or more by weight of pyrazoline compound. In some circumstances, such as in high-intensity application, however, it is preferred to employ solid compositions containing as much as from 5 to 98 percent or more by weight of the pyrazoline compound. Liquid or solid compositions in which the pyrazoline compound is present in higher concentration can be utilized as such or can be employed as concentrate compositions to be diluted to prepare actual treating compositions.

The liquid compositions containing active agent, i.e., the pyrazoline compound, can be prepared by admixing one or more of the active agents with water or an organic solvent, with or without the aid of a suitable surface-active dispersing agent or emulsifying agent, and admixing this mixture in an aqueous solution of the desired fertilizer.

Suitable organic solvents include acetone, diisobutylketone, methanol, ethanol, isopropyl alcohol, diethyl ether, toluene, methylene chloride, chlorobenzene and the petroleum distillates. The preferred organic solvents are those which are of such volatility that they leave little permanent residue in the soil.

Dispersing and emulsifying agents which can be employed in liquid compositions include condensation products of alkylene oxides with phenols and organic acids, alkyl aryl sulfonates, polyoxyalkylene derivatives of sorbitan esters, complex ether alcohols, mahogany soaps and the like. The surface-active agents are generally employed in the amount of from 1 to 20 percent by weight of the pyrazoline compound.

Solid compositions containing the active agent can be prepared by admixing the pyrazoline compound, dispersed in a volatile organic solvent, with the solid fertilizer. In another procedure, the solid fertilizer can be mechanically ground with a dispersion of the pyrazoline compound in a solvent and the resulting mixture prilled, granulated or otherwise formed into the desired form. After coating the solvent is vaporized off. In an additional procedure, solid granules of the fertilized are coated with a sticking agent such as mineral oil and then coated with a mixture of the pyrazoline compound and a solid carrier.

These solid compositions may, if desired also contain an alkyl aryl sulfonate or other surface-active dispersing agent. Depending upon the proportions of ingredients, these compositions can be employed without further modification or be considered as concentrates and subsequently further diluted with conventional solid carriers such as talc, chalk, gypsum, clays, or the like to obtain the desired treating composition. Furthermore, such concentrate compositions can be dispersed in water with or without added dispersing agent or agents to prepare aqueous soil treating compositions.

In these fertilizer compositions, it is desirable that the pyrazoline compound be present in an amount of at least about 0.05 percent by weight based on the weight of the nitrogen present in the fertilizer as reduced nitrogen and can be present in amounts as high as 95 percent by weight of the reduced nitrogen in the fertilizer. Generally, though, amounts of pyrazoline compound in excess of about 5.0 pecent yield no greater advantage and are therefore seldom used. Thus, when a fertilizer composition contains both reduced nitrogen and other forms of nitrogen, such as in the case of ammonium nitrate fertilizer compositions, the amount of pyrazoline compound is based on the weight of nitrogen present in the ammonium component.

The substituted pyrazolines of the method and composition of the invention are prepared by the reaction of 5-methyl-2-pyrazoline with a substituted acid chloride of the formula

Z—Cl wherein Z has the significance described above. Representative acid chlorides which may be employed as starting materials include methyl chloroformate, ethyl chloroformate, propyl chloroformate, isopropyl chloroformate, butyl chloroformate, methyl chlorothiolformate, ethyl chlorothiolformate, propyl chlorothiolformate, butyl chlorothiolformate, dimethylcarbamoyl chloride, N-methyl-N-ethylcarbamoyl chloride, diethylcarbamoyl chloride, N-propyl-N-butylcarbamoyl chloride, diisopropylcarbamoyl chloride, dibutylcarbamoyl chloride, dimethylthiocarbamoyl chloride, N-methyl-N-ethylthiocarbamoyl chloride, diethylthiocarbamoyl chloride, N-methyl-N-butylthiocarbamoyl chloride, dipropylthiocarbamoyl chloride, dibutylthiocarbamoyl chloride, methylsulfonyl chloride, ethylsulfonyl chloride, propylsulfonyl and butylsulfonyl chloride.

The reaction proceeds when the reactants are contacted and mixed in the presence of a hydrogen chloride acceptor such as pyridine, lutidine or the like, or a tertiary alkylamine such as trimethylamine or triethylamine. The reaction is preferably carried out in the presence of an inert organic solvent as a reaction medium. Representative and suitable organic solvents which can be employed as reaction media include ether, benzene and chlorinated solvents such as chloroform, methylene chloride and carbon tetrachloride. The reaction proceeds readily at temperatures of from −20° C. to 100° C. The exact proportions of the reactants are not critical, some of the desired product being obtained when the reactants are employed in any proportion. However, in going to completion, the reaction consumes the reactants and the hydrogen chloride acceptor in equimolar proportions and the use of the reactants and the hydrogen chloride acceptor in such proportions is preferred. Good yields are obtained with reaction times of about 4 to 5 hours. During the reaction, the hydrochloride salt of the hydrogen chloride acceptor forms and may precipitate from the mixture. This salt can be removed by such conventional procedures as filtration or extraction with water. The 1-substituted pyrazoline product can be separated by such conventional procedures as evaporation and distillation. The product separated as described above may be employed in the control of nitrification of soil or may be further purified by conventional procedures such as extraction and distillation.

The 5-methyl-2-pyrazoline employed herein and as a starting material to make the 1-substituted-5-methyl-2-pyrazolines is a known compound and is taught in U.S. Pat. No. 3,722,328 and can be prepared as taught therein and such is incorporated herein by reference thereto.

The following examples illustrate the invention but should not be construed as limiting the scope of the invention.

EXAMPLE I

5-Methyl-2-pyrazoline

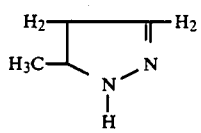

A stirred mixture of 11.4 grams of acetaldehydeazine and 0.1 gram (g) of anhydrous nickel (II) chloride was heated at reflux for 3 hours. The mixture was quenched by pouring it into 100 milliliters (mls) of ether. A tacky solid was removed by filtration and the filtrate distilled. After most of the ether was removed, distillation was continued using a partial aspirator vacuum. Fractions were taken every 1.5–2.0 mls of distillate. The first fraction contained essentially starting material. The second fraction contained starting material and product in a 3:7 ratio. The third fraction was mainly product with about 5–10 percent starting material. The last fraction was recovered in a yield of 1.3 g and was over 90 percent pure 5-methyl-2-pyrazoline. The product had a refractive index of $n_D{}^{25} = 1.4679$ and upon analysis was found to have carbon, hydrogen and nitrogen contents 55.86, 9.22 and 33.71 percent, respectively, as compared with the theoretical contents of 57.11, 9.59 and 33.31 percent, respectively, as calculated for the above-named compound.

EXAMPLE II

1-Acetyl-5-methyl-2-pyrazoline

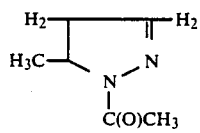

To a stirred solution of 6.5 g (0.0773 mole) of 5-methyl-2-pyrazoline and 8.08 g (0.08 mole) of triethylamine in 350 mls of ether was added in a rapid dropwise manner, a solution of 6.06 g (0.0773 mole) of acetylchloride in 100 mls of ether. After the addition was complete, the mixture was stirred at room temperature for 30 minutes then 50 mls of water was added. This mixture was stirred for 10 minutes. Sufficient sodium chloride was added to saturate the water present and the aqueous and ether phases were allowed to separate. The ether phase was removed and dried. The ether was evaporated off to yield 7 g of the crude product. This material was distilled at 68°–70° C. at 2 millimeters of mercury to give 4.5 g of the desired product as a colorless liquid. Upon analysis, the product was found to have carbon, hydrogen and nitrogen contents of 56.76, 7.79 and 22.26 percent, respectively, as compared with the theoretical contents of 57.12, 7.99 and 22.21 percent, respectively, calculated for the above-named compound.

EXAMPLE III

Aqueous ammonium fertilizer compositions containing a predetermined amount of nitrogen, by weight, and a sufficient amount of one of 5-methyl-2-pyrazoline and 1-acetyl-5-methyl-2-pyrazoline, dispersed in a predetermined amount of water, to give compositions containing 0.015, 0.03, 0.063, 0.125, 0.25, 0.5, 1.0 and 2.0 parts by weight of the pyrazoline compound per million parts of the soil were prepared by dispersing the pyrazoline compound in a predetermined amount of an aqueous ammonium sulfate solution.

The compositions so prepared were employed to treat a sandy loam soil having a pH of 7.2 and containing 1.2 percent organic matter. The soil was in containers which admitted of being sealed to prevent loss of moisture. In the treating operation, the amount of the composition employed was sufficient to bring the soil moisture to ⅓ bar and the soil thoroughly mixed to insure a substantially uniform distribution of the composition throughout the soil.

In a check operation, other soils similarly prepared were fertilized with a similar aqueous fertilizer composition containing the same amount of water but no pyrazoline compound. The composition was applied in an amount to supply the same concentration of nitrogen to the soil as the treating composition containing the complex. All of the containers were then sealed and maintained at about 80° F. for a period of 14 days. An additional set of treated soils were sealed and maintained for 20 days.

At the end of the 14 and 20 day periods, the extent of nitrification of the added ammonium sulfate fertilizer determined by analyses for nitrate nitrogen. The analysis was carried out using a nitrate specific electrode similar to that described by Keeney and Nelson on page 663 of Methods of Soil Analysis, Part 2 (Second Edition), ASA, Inc., Madison, Wisc., 1982. The results of this analysis and the compounds tested are set forth below in Table I.

TABLE I

| Compound Tested | No. of Days | Percent ammonium nitrogen remaining after 14 and 20 days at indicated treating concentrations | | | | | | | |
|---|---|---|---|---|---|---|---|---|---|
| | | 0.015 | 0.03 | 0.063 | 0.125 | 0.25 | 0.5 | 1.0 | 2.0 |
| 5-methyl-2-pyrazoline | 14 | 24 | 0 | 24 | 8 | 52 | 95 | 100 | 100 |
| | 20 | 0 | 0 | 29 | 8 | 32 | 74 | 76 | 78 |
| 1-acetyl-5-methyl-2-pyrazoline | 14 | 24 | 0 | 49 | 18 | 27 | 33 | 86 | 83 |
| | 20 | 1 | 4 | 0 | 8 | 39 | 0 | 24 | 57 |
| Control | | 0 | | | | | | | |

What is claimed is:

1. A composition which comprises a reduced nitrogen fertilizer in admixture with from about 0.05 to about 98 percent by weight of an active agent which is 5-methyl-2-pyrazoline or a pyrazoline compound which corresponds to the formula

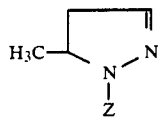

wherein Z represents alkylcarbonyl, alkylcarboxyl, alkylthiocarboxyl, N,N-dialkylcarbamoyl, N,N-dialkylthiocarbamoyl or alkylsulfonyl wherein the term alkyl independently represents a straight or branched chain alkyl group of 1 to 4 carbon atoms, inclusive or a cyclic alkyl group of 3 or 4 carbon atoms, inclusive.

2. The composition as defined in claim 1 wherein Z represents acetyl.

3. The composition as defined in claim 1 wherein the active agent is 5-methyl-2-pyrazoline.

4. A method for treating soil to inhibit the conversion therein of ammonium nitrogen to nitrate and nitrite nitrogen and to prevent rapid loss of ammonium nitrogen therefrom which comprises applying to soil a nitrification suppressing amount of a composition comprising a reduced nitrogen fertilizer in admixture with from about 0.05 to about 98 percent by weight of an active agent which is 5-methyl-2-pyrazoline or a pyrazoline compound which corresponds to the formula

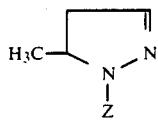

wherein Z represents alkylcarbonyl, alkylcarboxyl, alkylthiocarboxyl, N,N-dialkylcarbamoyl, N,N-dialkylthiocarbamoyl or alkylsulfonyl wherein the term alkyl independently represents a straight or branched chain alkyl group of 1 to 4 carbon atoms, inclusive or a cyclic alkyl group of 3 or 4 carbon atoms, inclusive.

5. The method as defined in claim 4 wherein Z represents acetyl.

6. The method as defined in claim 4 wherein the active agent is 5-methyl-2-pyrazoline.

7. A nitrification inhibition-fertilizer composition useful for delayed incorporation into soil which comprises a reduced nitrogen fertilizer in admixture with from about 0.05 to about 98 percent by weight of an active agent which is 5-methyl-2-pyrazoline or a pyrazoline compound which corresponds to the formula

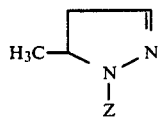

wherein Z represents alkylcarbonyl, alkylcarboxyl, alkylthiocarboxyl, N,N-dialkylcarbamoyl, N,N-dialkylthiocarbamoyl or alkylsulfonyl wherein the term alkyl independently represents a straight or branched chain alkyl group of 1 to 4 carbon atoms, inclusive or a cyclic alkyl group of 3 or 4 carbon atoms, inclusive.

8. The composition as defined in claim 7 wherein Z represents acetyl.

9. The composition as defined in claim 7 wherein the active agent is 5-methyl-2-pyrazoline.

* * * * *